United States Patent [19]

Hills

[11] Patent Number: 4,578,727

[45] Date of Patent: Mar. 25, 1986

[54] DEVICE FOR STABILIZING THE MOVEMENT OF A FLOPPY DISK OVER A MAGNETIC HEAD

[75] Inventor: Robert G. C. Hills, Spencerport, N.Y.

[73] Assignee: Eastman Kodak Company, Rochester, N.Y.

[21] Appl. No.: 583,558

[22] Filed: Feb. 27, 1984

[51] Int. Cl.⁴ .................... G11B 17/32; G11B 5/016
[52] U.S. Cl. ................................ 360/102; 360/86; 360/99
[58] Field of Search ................ 360/102–103, 360/99, 122, 130.34, 129, 104, 86, 133; 369/115

[56] References Cited

U.S. PATENT DOCUMENTS

| | | | |
|---|---|---|---|
| 3,178,719 | 4/1965 | Shapiro | 346/74 |
| 3,821,813 | 6/1974 | Freeman | 360/103 |
| 4,003,091 | 1/1977 | Wright | 360/102 |
| 4,074,330 | 2/1978 | Norton et al. | 360/102 |
| 4,195,322 | 3/1980 | Cox et al. | 360/103 |
| 4,376,960 | 3/1983 | Karol | 360/99 |
| 4,396,965 | 8/1983 | DeMoss | 360/102 |
| 4,414,592 | 11/1983 | Losee et al. | 360/102 |
| 4,471,397 | 9/1984 | Cloutier | 360/133 |

FOREIGN PATENT DOCUMENTS

| | | | |
|---|---|---|---|
| 54-107323 | 8/1979 | Japan | 360/102 |
| 55-157161 | 6/1980 | Japan | 360/99 |
| 58-177558 | 10/1983 | Japan | 360/103 |
| 2101391 | 1/1983 | United Kingdom . | |

OTHER PUBLICATIONS

Nelson et al., "Stabilized Wasp-Waist Head," IBM Tech. Disc. Bull., vol. 19, No. 5, Oct. 1976.

Primary Examiner—A. J. Heinz
Assistant Examiner—Benjamin Urcia
Attorney, Agent, or Firm—Roger A. Fields

[57] ABSTRACT

In a head-to-disk stabilizing unit of a recording and/or reproducing apparatus, a flat air bearing surface surrounds an elongate opening to a negative pressure cavity. A record and/or playback head is arranged in the cavity with its transducer means (e.g., a magnetic gap) disposed at the opening in substantially coplanar relation with the air bearing surface. If a flexible magnetic disk is rotated at a relatively high speed to move successive radial portions of the disk over the air bearing surface and the opening, the surface will stabilize each portion of the rotated disk by damping out any flutter before a negative pressure formed in the cavity pulls the disk portion substantially into contact with the transducer means, thereby ensuring a constant and intimate transducer-to-disk magnetic coupling.

The elongate opening to the cavity is long in proportion to width in a direction tangential to that of rotating the disk and, preferably, has a wasp waist configuration with a narrow waist disposed proximate the transducer means of the magnetic head, to reduce pull down deformation of the disk in the vicinity of the transducer means and to effect the greatest stabilization of the disk (by the air bearing surface) generally at the same location. Such an arrangement serves to extend the useful life of the disk.

8 Claims, 10 Drawing Figures

DEVICE FOR STABILIZING THE MOVEMENT OF A FLOPPY DISK OVER A MAGNETIC HEAD

BACKGROUND OF THE INVENTION

1. Field of the Invention

The invention generally relates to a magnetic recording and/or reproducing apparatus for use with a flexible storage medium, such as a magnetic disk. More particularly, the invention relates to apparatus that provides a stable, i.e., substantially constant, transducer-to-medium relation for enhancing the recording or reproducing of information on the flexible medium.

2. Description of the Prior Art

Magnetic recording and/or reproducing may be divided into two general techniques. The first one is a "non-contacting" technique in which the storage medium, often a magnetic disk, and the transducer remain slightly spaced apart by a layer of air. The second one is a "contacting" technique in which the storage medium, often a magnetic tape, and the transducer are substantially in physical contact. For successfully recording or reproducing information on a magnetic medium, using either type of technique, particularly at high densities such as employed in a video recorder or computer equipment, the transducer-to-medium relation should remain constant over a wide range of operating parameters. Variations in the transducer-to-medium relation can have a significant effect on the fringing flux pattern and, therefore, the resolution of the sensing and recording of information on the magnetic medium. Unfortunately, with a magnetic medium, especially one that is flexible, as for example a floppy disk, the transducer-to-medium relation may be varied by the interaction of many parameters, such as temperature, humidity, relative speed between the medium and the transducer, penetration of the transducer into the medium, the contour of surface areas surrounding the transducer, flexibility and variations in thickness of the medium, the angles of attack and tilt of the transducer with respect to the medium, etc.

Various non-contacting type recording and/or reproducing apparatus have been proposed which seek to ensure a substantially constant spacing between a flexible magnetic disk and a magnetic head. For example, in U.S. Pat. No. 3,178,719, a flexible magnetic disk initially in close proximity (e.g., 0.005″-0.010″) to a flat air bearing surface of an annular plate, usually referred to as a Bernoulli plate, is rotated at a relatively fast speed, which causes the rotated disk to assume a stable position at a small distance from the air bearing surface. It is believed that the stable position results from a balance of centrifugal and Bernoulli forces that causes the rotated disk to reach a condition of equilibrium closely spaced from the air bearing surface. A plurality of magnetic heads, radially disposed with respect to the rotated disk, are embedded in the Bernoulli plate, either slightly above or slightly below e.g., 0.002″) or flush with the air bearing surface. Since the close spacing between the air bearing surface and the rotated disk, and therefore the critical spacing between the magnetic heads and the rotated disk, varies as a function of the disk radius, a vacuum pump is included to create a partial vacuum in respective round openings in the plate, which each contain one of the heads. The partial vacuum deforms small annular areas of the flexible disk around the magnetic heads to independently control the close spacing between each one of the heads and localized portions of the disk.

Although the non-contacting recording apparatus disclosed in U.S. Pat. No. 3,178,719 may perform satisfactorily, it requires the use of a vacuum pump to control the critical head-to-disk spacing, which increases the construction and operating costs of such apparatus. A simpler non-contacting recording apparatus that dispenses with the need for a vacuum pump is disclosed in U.S. Pat. No. 4,074,330. In that apparatus, an annular (Bernoulli) plate has a groove which is sealed at its ends, is open to a flexible disk, and is radially disposed with respect to the disk. A magnetic head, movable along the groove, projects from the groove to a location slightly above a flat air bearing surface of the plate facing the disk, to penetrate into the disk. Bracketing the groove, on either side of the head, is a pair of up-stream and down-stream convex surfaces which are radially coextensive with the groove. The respective apexes of the two convex surfaces are located closer to the flat air bearing surface of the plate than to the radially extending sides of the groove. With this arrangement, it is purported that the amount of air carried by the rotated disk out of the groove is greater than the amount of air carried by such disk into the groove. The net result is to exhaust air from the groove, which generates a Bernoulli pull down force on the rotated disk over the groove. Such pull down force is opposite to the tendency of the rotated disk to dimple away from the magnetic head because of penetration of the head into the disk, and therefore ensures a stable close spacing between the head and the disk.

The flat air bearing surfaces of the Bernoulli plates in the '719 and '330 patents, as well as in other non-contacting recording apparatus, such as disclosed in U.S. Pat. No. 4,003,091, are larger than the flexible disks with which they are used. This arrangement makes it impossible for such an air bearing surface to penetrate into a flexible disk jointly with a magnetic head, which prevents use of the apparatus in certain instances, for example with a disk that is housed in a cartridge. Moreover, the round vacuum-supplied opening in the '719 patent for deforming a flexible disk about a magnetic head, and the convex surfaces in the '330 and '091 patents for effecting pull down of a flexible disk against a magnetic head, are of respective configurations that may deform the flexible disk to such an extent that its useful life may be shortened.

When a flexible magnetic disk is housed in a cartridge, the situation becomes even more critical because the stability of the head-to-disk relation may be affected by certain surfaces of the cartridge proximate the rotated disk. Therefore, to ensure a stable head-to-disk relation in a disk cartridge it has been proposed to have the head contact the disk, as disclosed in U.K. Patent Application GB 2,101,391A, published Jan. 12, 1983 and in *IEEE Transactions on Consumer Electronics*, Vol. CE-28, No. 3, August 1982, p. 326. In that example, the disk cartridge includes an opposed pair of openings which extend radially on either side of the magnetic disk. As the flexible disk is rotated, a magnetic head is moved along one of the openings in the nominal plane of the disk to penetrate the disk, and a guide plate in the other opening limits the tendency of the rotated disk to lift off the magnetic head. Use of the guide plate ensures a stable, intimate head-to-disk contact. Without the guide plate, the head-to-disk relation becomes unstable and may vary to the extent that the signal-to-noise ratio will be unacceptable.

While such use of a guide plate with a magnetic head for achieving a stable head-to-disk contact in a cartridge may perform satisfactorily, the spacing between the head and the guide plate is especially critical, and therefore can be a problem. If the spacing is too small, the disk and the head will become degraded rather quickly by wear of the one against the other. If the spacing is too large, the head-to-disk relation will become unstable. As a result, the prior art has required that relatively expensive means be employed to establish the spacing and to maintain it with some degree of assurance, particularly after extended use of the head and the guide plate.

SUMMARY OF THE INVENTION

The invention relates to a contacting type recording and/or reproducing apparatus in which a flat air bearing surface surrounds an elongate opening to a negative pressure cavity. A record and/or playback head is arranged in the cavity with its transducer means (e.g., a magnetic gap) disposed at the opening in substantially coplanar relation with the air bearing surface. If a flexible magnetic disk is rotated at a relatively high speed (e.g., 60 revolutions per second) to move successive radial portions of the disk over the air bearing surface and the opening, the surface will stabilize each portion of the rotated disk (by damping out any flutter) before a negative or low pressure formed in the cavity pulls the disk portion substantially into contact with the transducer means, thereby ensuring a constant and intimate transducer-to-disk magnetic coupling.

According to one feature of the invention, the elongate opening to the cavity has a shape that is long in proportion to width generally in a direction tangential to that of rotating the disk, which serves to limit pull down deformation of the disk. Preferably, the opening has a wasp waist or hourglass configuration with a narrow waist disposed proximate the transducer means of the magnetic head, to reduce pull down deformation of the disk (the most) in the vicinity of the transducer means and to effect the greatest stabilization of the disk (by the air bearing surface) generally at the same location. This arrangement is an improvement over those prior art devices, for example disclosed in U.S. Pat. Nos. 3,178,719 and 4,003,091, in which the pull down means has a round or annular shape to encircle the magnetic head, and therefore causes pull down deformation of the disk around the head to such a degree that the useful life of the disk is shortened and head-to-disk contact is precluded. Moreover, the exact shape of the opening in the invention is not a critical factor as in the instance of the convex surfaces in U.S. Pat. Nos. 4,003,091 and 4,074,330. In those patents, the contour of the convex surfaces and the location of the apex of such surfaces are critical factors in effecting the desired (noncontacting) transducer-to-disk relation.

According to another feature of the invention, the air bearing surface is considerably smaller than the disk to permit the surface to penetrate with the transducer into the nominal plane of the disk. Thus, in contrast to the prior art devices in which the Bernoulli plate is larger than the disk, the air bearing surface may be used effectively with a disk that is housed in a cartridge, simply by inserting such surface (with the transducer) through the radial opening in the cartridge to access the disk.

BRIEF DESCRIPTION OF THE DRAWINGS

The invention will be described with respect to the drawings, wherein.

DESCRIPTION OF THE PREFERRED EMBODIMENT

Before proceeding with a description of the preferred embodiment of the invention, it is well to first consider a magnetic disk cartridge with which the preferred embodiment may be used.

Magnetic Disk Cartridge

Figure 1:
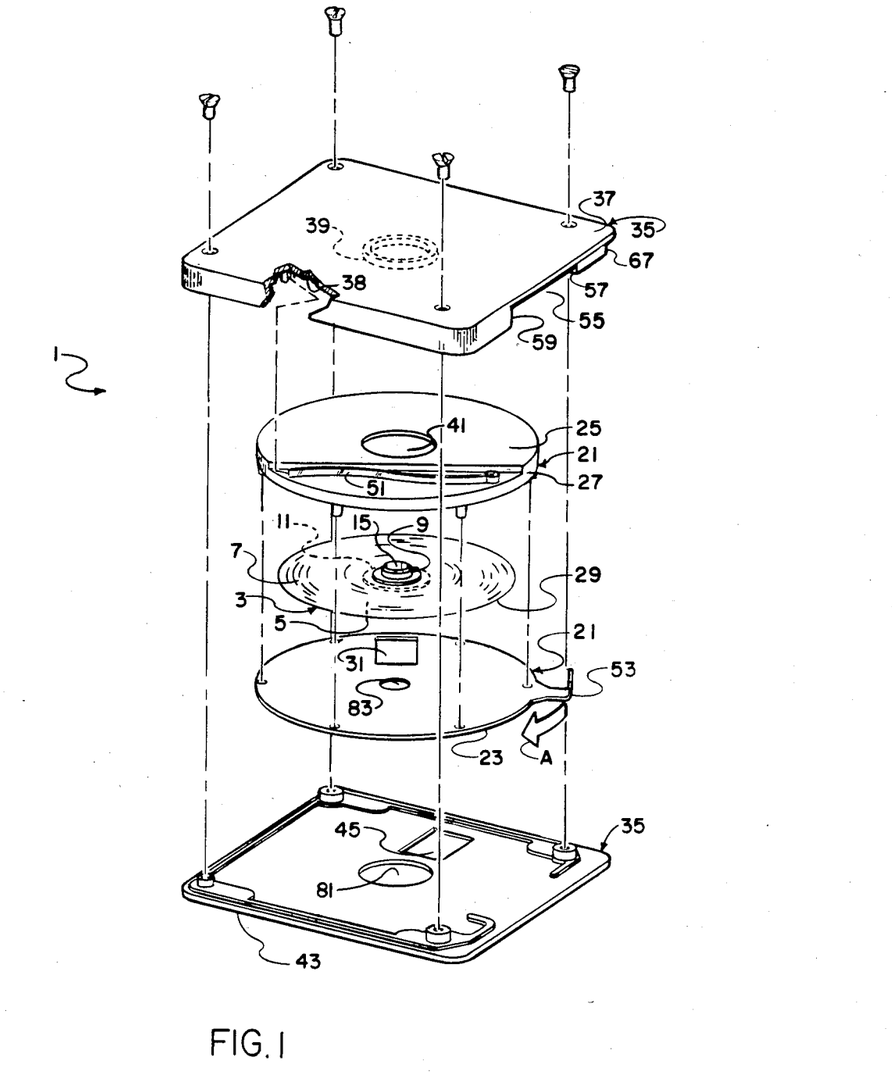
FIG. 1 is an exploded perspective view of a magnetic disk cartridge.
Figure 2:
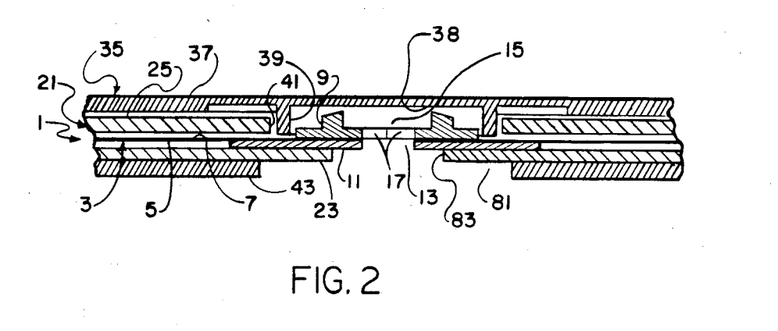
FIG. 2 is a partial sectional view of a central portion of the disk cartridge.
Figure 3:
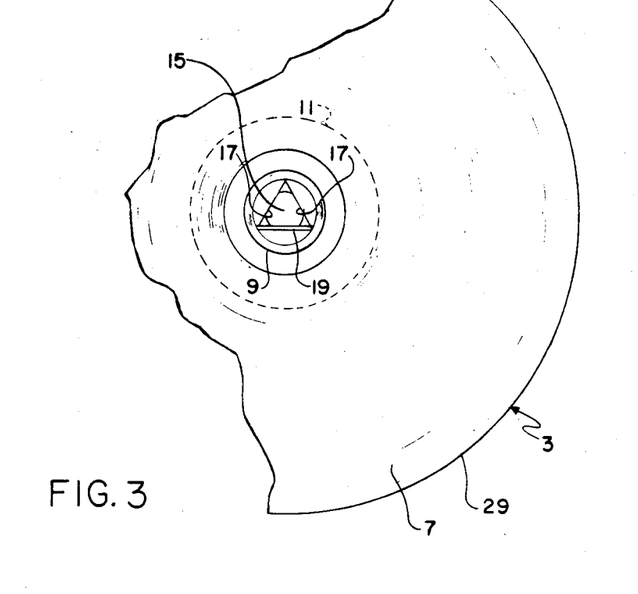
FIG. 3 is a plan view of the hub configuration of a flexible magnetic disk in the cartridge.

Referring now to the drawings, FIGS. 1 and 2 show a magnetic disk cartridge 1 intended for use in a disk recording and/or reproducing apparatus. The cartridge 1 includes a flexible disk 3 (e.g., a floppy disk) having a planar magnetic-coated surface 5 for storing information signals and a planar non-magnetic support surface 7. A rotation hub 9 and an annular element 11, coaxially arranged with respect to a central hole 13 in the disk 3, are fixed to the respective support and magnetic surfaces 7 and 5 of the disk, as shown in FIG. 2. The hub 9 has a hole 15 for receiving a drive shaft in the recording and/or reproducing apparatus to rotate the disk 3. A pair of angled positioning edges 17, shown in FIG. 3, are arranged within the hole 15 in the hub 9 to tangentially contact the circular periphery of the drive shaft, thereby centering the disk 3 relative to the axis of the drive shaft. A resilient chordal element 19 extends across the hole 15, spaced from the two angled positioning edges 17, to hold the drive shaft firmly against both of the positioning edges.

A rigid protective envelope 21 is provided to enclose the flexible disk 3 in a cylindrically-shaped chamber, though the envelope is dimensioned to allow the disk to freely rotate within the chamber. As shown in FIGS. 1 and 2, the envelope 21 includes a pair of substantially parallel, circular-shaped face walls 23 and 25, each having a similar size diameter which is slightly larger than the diameter of the disk 3. The two face walls 23 and 25 generally cover the respective magnetic and support surfaces 5 and 7 of the disk 3, but they are slightly spaced from such surfaces. A continuous side wall 27 of the envelope 21, encircling the circumferential edge 29 of the disk 3, connects the face walls 23 and 25, as shown in FIG. 1. The face wall 23 has a rectangular-shaped opening 31 which is arranged radially with respect to the disk 3 to provide limited radial access to the magnetic surface 5, for a magnetic head in the recording and/or reproducing apparatus. The access opening 31 radially extends lengthwise at least to separate locations opposite the inner and outer effective limits of the annular recording area on the magnetic surface 5.

A rigid rectangular-shaped housing 35 encloses the envelope 21 and is dimensioned to allow the envelope to rotate within the housing. As viewed in FIGS. 1 and 2, a top wall 37 of the housing 35 includes, on its inside surface 38, an integrally formed, centered, tubular-like member 39. The tubular-like member 39 extends into a central opening 41 in the face wall 25 of the envelope 21 to support the envelope for rotation relative to the housing 35 substantially about the same axis as that of the disk 3. The rotation hub 9 of the disk 3 is located within the tubular-like member 39 to loosely support the disk for rotation.

A bottom wall 43 of the housing 35, as viewed in FIG. 1, has a rectangular-shaped opening 45 which is normally out of registration with the access opening 31 in the face wall 23 of the envelope 21, in order for the opening 45 to be closed by the face wall. The opening 45 corresponds substantially in size and arrangement to the opening 31. For example, the opening 45 is arranged radially with respect to the disk 3 in the same way that the opening 31 is radially arranged with respect to the disk. A return spring 51 has one end fixed to the face wall 25 of the envelope 21 and another end fixed to the inside surface 38 of the top wall 37 of the housing 35. A tab 53, integrally formed with the face wall 23 of the envelope 21, extends through a side slot 55 in the housing 35. The return spring 51 ordinarily maintains the opening 31 in the envelope 21 displaced from the opening 45 in the housing 35 by urging the envelope to rotate in a direction opposite to that indicated by the arrow A until the tab 53 is abutted against a stop 57 at one end of the side slot 55. When the tab 53 is moved in the direction of the arrow A until it abuts against a stop 59 at the other end of the side slot 55, the envelope 21 will be rotated in the same direction to position the opening 31 substantially in registration with the opening 45. Then, a magnetic head may be admitted through such pair of registered openings 31 and 45 to the magnetic surface 5 of the disk 3.

The cartridge 1 includes the envelope 21 within the housing 35 for twice enclosing the flexible disk 3 to prevent dust and other contaminants from reaching its sensitive magnetic surface 5 and to provide a rigid interior enclosure for the flexible disk, which supplements the rigid housing in protecting the fragile disk from being folded or otherwise damaged.

Magnetic Recording and/or Reproducing Apparatus

Figure 4:
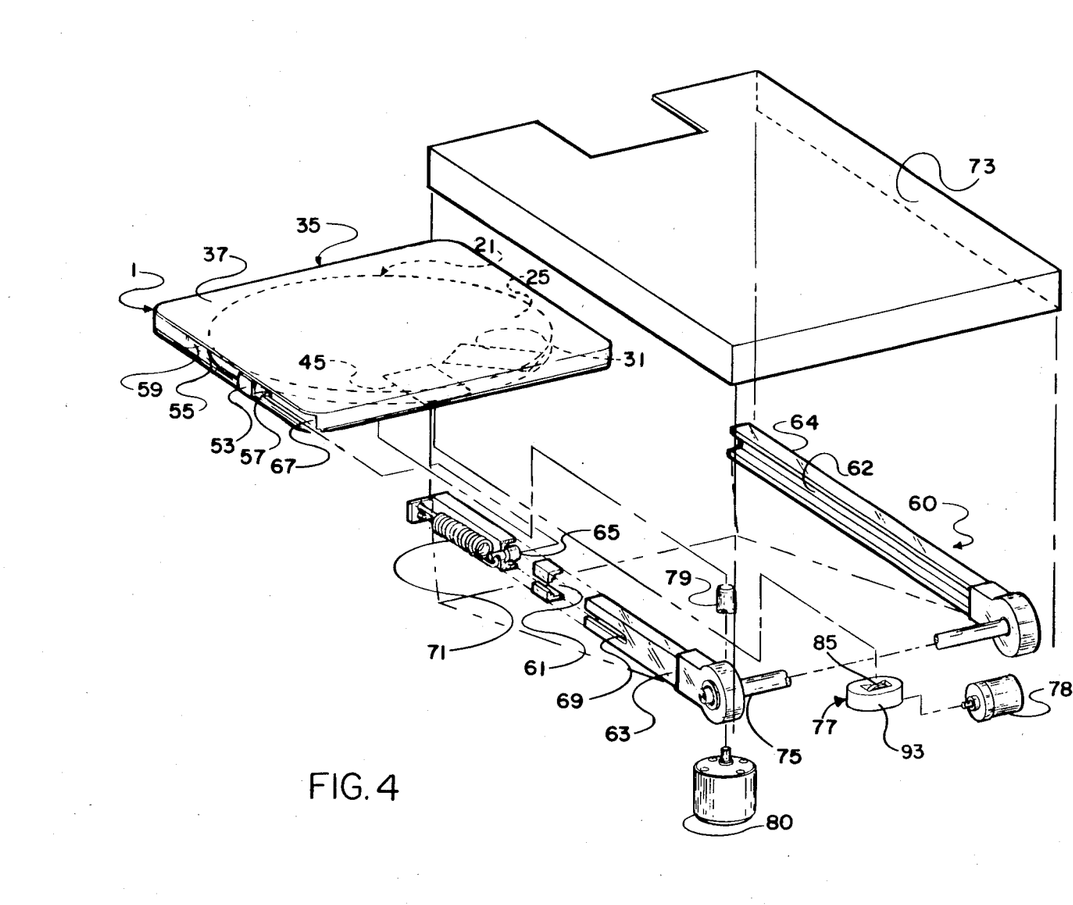
FIG. 4 is a schematic perspective view of the disk cartridge and a cartridge-loading disk drive assembly in a magnetic recording and/or reproducing apparatus, according to a preferred embodiment of the invention.

FIG. 4 shows the manner in which the disk cartridge 1 may be inserted into a cartridge-loading disk drive assembly 60 of a magnetic recording and/or reproducing apparatus. When the cartridge 1 is slid into a pair of substantially parallel, u-shaped channels 61 and 62 defined by respective arms 63 and 64, a boss 65 located in the channel 61 will first enter a guide groove 67 in the housing 35 and will then swing the tab 53 along the side slot 55 in the housing from the stop 57 to the stop 59. Thereupon, the envelope 21 will be rotated relative to the housing 35 to position the opening 31 in the envelope substantially in registration with the opening 45 in the housing, to provide limited radial access to the magnetic surface 5 of the disk 3. With continued movement of the cartridge 1 into the channels 61 and 62, the tab 53 (against the stop 59) will slide the boss 65 along a support slot 69 in the arm 63 in opposition to the urging of a return spring 71. Then, upon completed movement of the cartridge 1 into the channels 61 and 62, releasable means, not shown, may be manually operated to secure the cartridge in place.

When an assembly cover 73 atop the arms 63 and 64 is pushed downward, as viewed in FIG. 4, with the cartridge 1 secured in place, the cover (as well as the arms and the cartridge) will pivot about a supporting rod 75 until the cartridge comes to rest in a horizontal position against stop means, not shown. As the cover 73 is pushed downward, a head-to-disk stabilizing unit 77, movable radially with respect to the disk 3 by a stepping motor 78, will be received in the pair of registered openings 31 and 45 to access the magnetic surface 5 of the disk, and a drive spindle 79 rotated by a motor 80 will be received in the hole 15 in the hub 9 of the disk to rotate the disk. As shown in FIG. 1, the bottom wall 43 of the housing 35 and the face wall 23 of the envelope 21 have respective central openings 81 and 83 for admitting the drive spindle 79 into the hole 15 in the hub 9 to rotate the disk 3.

Figure 5:
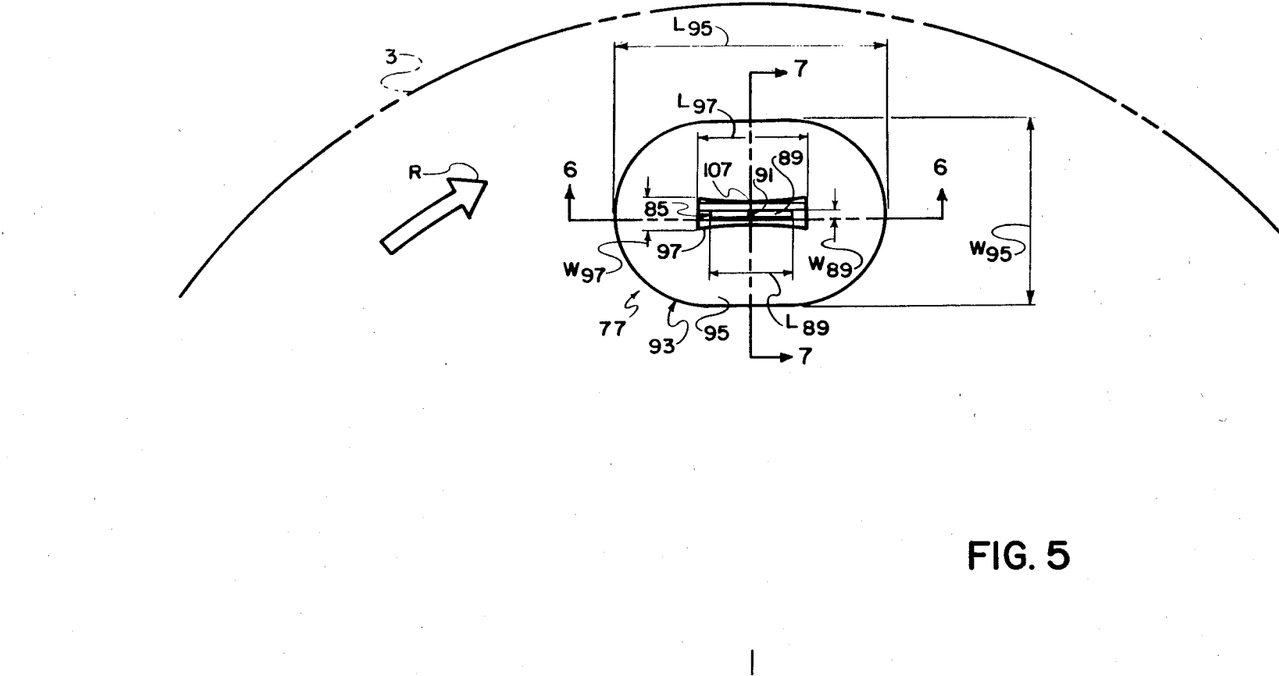
FIG. 5 is a top plan view of an improved head-to-disk stabilizing unit in the disk drive assembly.
Figure 6:
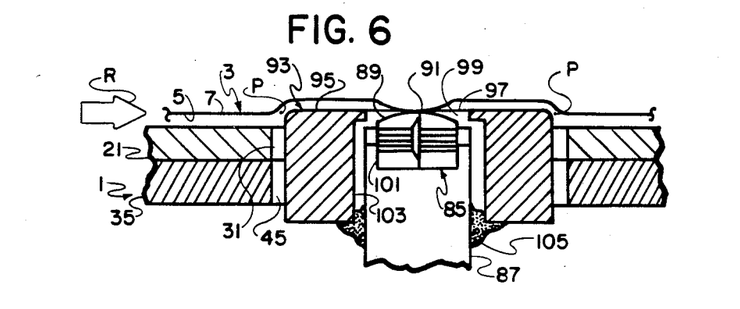
FIG. 6 is a sectional view of the head-to-disk stabilizing unit (received in an access opening in the disk cartridge) as seen in the direction of the arrows from the lines 6—6 in FIG. 5.
Figure 7:
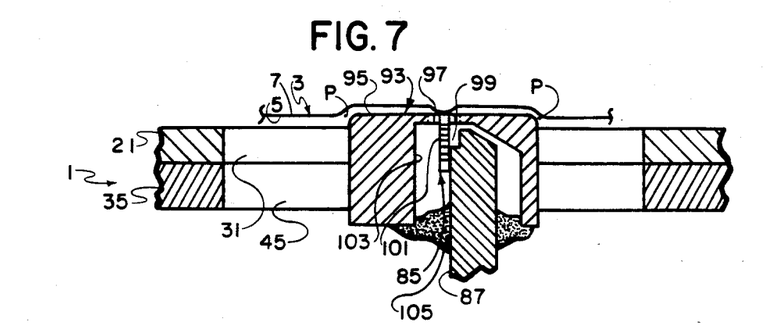
FIG. 7 is a sectional view of the stabilizing unit (received in the access opening in the disk cartridge) as seen in the direction of the arrows from the lines 7—7 in FIG. 5.

Details of the head-to-disk stabilizing unit 77 are shown in FIGS. 5, 6, and 7. The illustrated head is a magnetic recording or playback head 85 having one end fixed to a non-magnetic shoe 87 and the other end forming an operating surface 89, which is the surface that contacts the magnetic surface 5 of the disk 3. As shown in FIGS. 5 and 6, respectively, the operating surface 89 has a length and a width $L_{89}$, $W_{89}$, and a contour that is convex. The length $L_{89}$ is long in proportion to the width $W_{89}$ in a direction tangential to that of rotating the disk 3. The direction of disk rotation is indicated by the arrow R in FIGS. 5 and 6. A transducer means, such as a magnetic gap 91, is located in the operating surface 89 for coacting with the magnetic surface 5 of the disk 3 to record or playback information signals on the disk surface.

The typical dimensions of the operating surface 89 of a record head are as follows:
Length $L_{89}$ is 0.118";
Width $W_{89}$ is 0.0024";
Radius is 0.40"; and
Gap 91 is 0.000018".
The typical dimensions of the operating surface 89 of a playback head would be the same, except as follows:
Width $W_{89}$ is 0.0016"; and
Gap 91 is 0.000012".

A non-magnetic stabilizer block 93 includes a flat, highly polished, air bearing surface 95, which is substantially smaller than the disk 3 to permit such surface to slightly penetrate into the nominal plane P of the disk, preferably a distance within the range of 0.001"–0.004", as shown in FIGS. 6 and 7. When used, for example, with a disk 3 that has a diameter of 3.0", the length $L_{95}$ and the width $W_{95}$ of the air bearing surface 95 may be 0.350" and 0.250", respectively. The air bearing surface 95 surrounds an elongate opening 97 to a negative pressure cavity 99 in the block 93. The cavity 99 contains the magnetic head 85, which is disposed in the cavity with its respective sides 101 spaced from the steep walls 103 of the cavity. As shown in FIGS. 6 and 7, the cavity 99 is defined by a hole in the block 93 that is sealed at an end remote from the elongate opening 97 by a non-magnetic potting compound 105, such as epoxy. The compound seal 105 supports the shoe 87, on which the head 85 is fixed, to locate the magnetic gap 91 of the head at the elongate opening 97, in substantially coplanar relation with the air bearing surface 95. This permits a small portion of the operating surface 89 of the head, on either side of the magnetic gap 91, to penetrate into the nominal plane P of the disk 3 jointly with the air bearing surface 95.

When the stabilizer block 93 is received in the pair of registered openings 31 and 45 in the envelope 21 and the housing 35 of the cartridge 1, to permit the air bearing surface 95 and the head gap 91 to jointly access the magnetic surface 5 of the disk 3, means, not shown, connected to the block limit penetration of the air bearing surface and the head gap to slightly (e.g., 0.001"–0.004") into the nominal plane P of the disk. Then rotation of the disk 3 in the direction R at a relatively fast speed (e.g., 60 revolutions per second) to move successive radial portions of the disk over the air bearing surface 95 and the elongate opening 97 to the cavity 99 will remove air from the cavity, causing the formation of a negative or low pressure in the cavity. The negative pressure generates a pull down force on each portion of the rotated disk 3 as such portion is moved over the elongate opening 97, which will momentarily deflect that portion lightly into contact with the head gap 91 and the operating surface 89 adjacent the head gap, as shown in FIGS. 6 and 7. The air bearing surface 95 will stabilize each portion of the rotated disk 3 by damping out any flutter before the negative pressure at the opening 97 pulls such portion into contact with the head gap 91, thereby ensuring a stable and intimate head-to-disk magnetic coupling.

The elongate opening 97 to the cavity 99 has a length and a width $L_{97}$, $W_{97}$. The length $L_{97}$ is long in proportion to the width $W_{97}$ in a direction tangential to the direction R of rotating the disk 3, as shown in FIG. 5. Such an arrangement serves to limit pull down deformation of the rotated disk at the elongate opening 97. Preferably, the opening 97 has a wasp waist or hourglass configuration with a narrow waist 107 disposed proximate the head gap 91, to reduce pull down deformation of the rotated disk (the most) in the vicinity of the head gap and to effect the greatest stabilization of the disk by the air bearing surface 95 generally at the same location. The typical dimensions of the elongate opening 97 with a wasp waist configuration are as follows:
Length $L_{97}$ is 0.140";
Maximum width $W_{97}$ is 0.040"; and
Minimum width at narrow waist 107 is 0.030".

Figure 8:
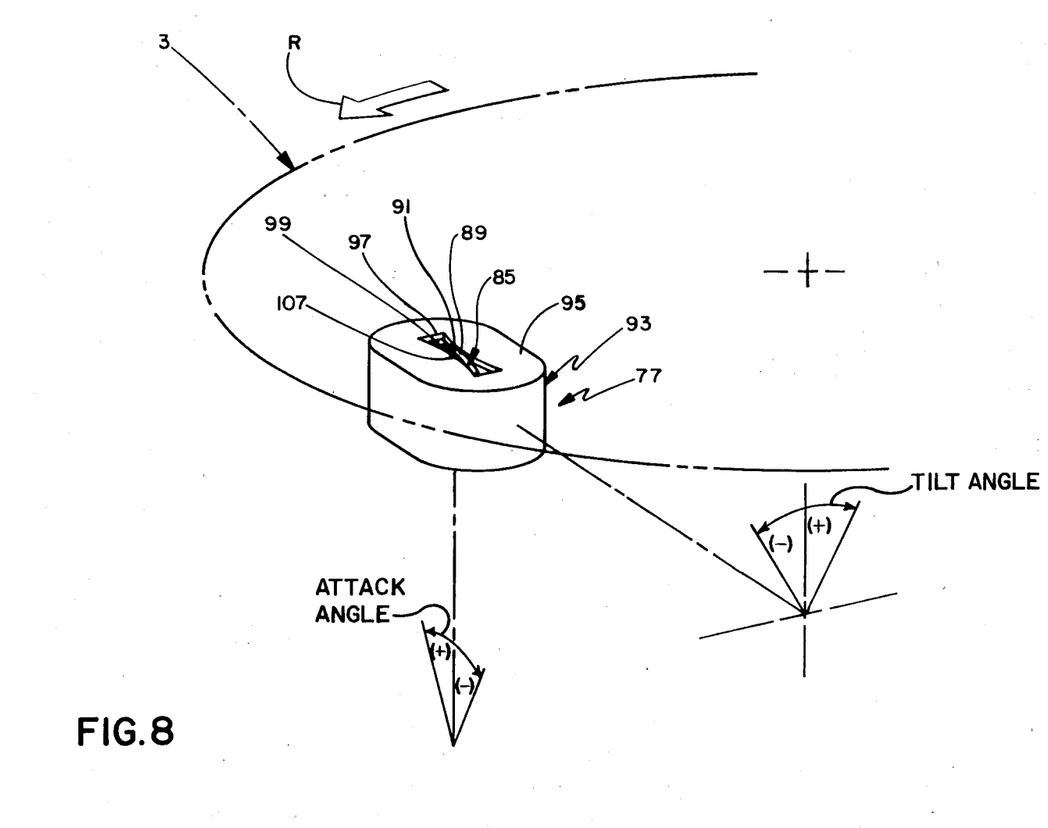
FIG. 8 is a schematic perspective view of the head-to-disk stabilizing unit and the flexible magnetic disk, depicting the angles of attack and tilt of the stabilizing unit with respect to the magnetic disk.
Figure 9:
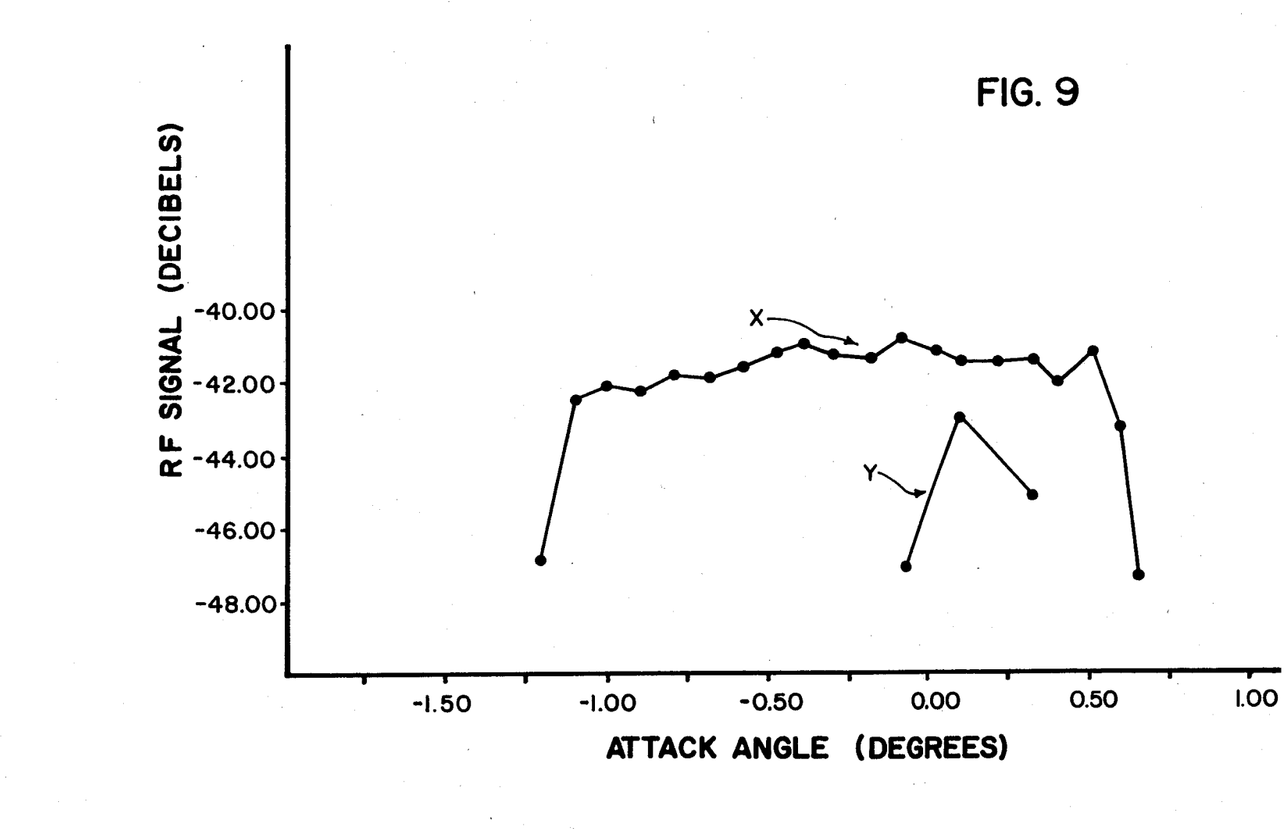
FIG. 9 is a graph of the radio frequency (RF) signal vs. the angle of attack, showing respective sets of lines X and Y representing the improved head-to-disk stabilizing unit and a known head-disk-guide arrangement similar to the one disclosed in U.K. Patent Application GB No. 2101391A.
Figure 10:
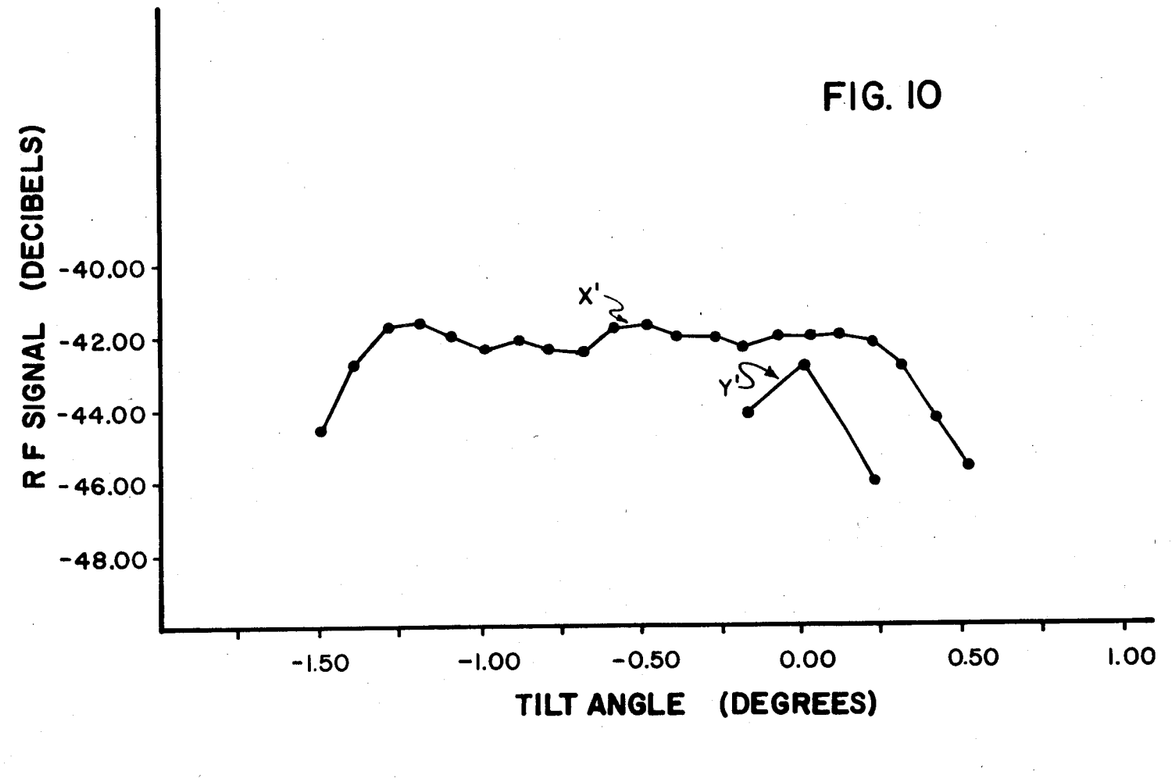
FIG. 10 is a graph of the RF signal vs. the tilt angle, showing respective sets of lines X' and Y' representing the same devices as in FIG. 9.

The head-to-disk stabilizing unit 77 is relatively insensitive to variations (from 0°) in the angles of attack and tilt of the air bearing surface 95 and the head gap 91 with respect to the nominal plane P of the rotated disk 3. These angles are schematically depicted in FIG. 8, which shows the head-to-disk stabilizing unit 77 and the rotated disk 3. A series of tests was conducted comparing the head-to-disk stabilizing unit 77 with a magnetic head and cooperating disk guide arranged similarly to the ones disclosed in U.K. Patent Application GB No. 2101301A. The results of the tests are illustrated in FIGS. 9 and 10. FIG. 9 is a graph of the radio frequency (RF) signal vs. the angle of attack, showing respective sets of lines X and Y representing the head-to-disk stabilizing unit 77 and the prior art magnetic head and disk guide arrangement. FIG. 10 is a graph of the RF signal vs. the tilt angle, showing respective sets of lines X' and Y' representing the same devices as in FIG. 9. A comparison of the two sets of lines X and Y in FIG. 9 and X' and Y' in FIG. 10 indicates the improved insensitivity of the head-to-disk stabilizing unit 77 to variations (from 0°) in the angles of attack and tilt.

While the invention has been described with reference to a preferred embodiment, it will be understood that various modifications may be effected within the ordinary skill in the art without departing from the scope of the invention. For example, instead of containing either a record head or a playback head, the cavity 99 in the stabilizer block 93 might contain both of such heads or a single record/playback head to provide recording and reproducing capabilities. Moreover, the wasp waist opening 97 to the cavity 99 might be arcuate along its length $L_{97}$.

I claim:
1. A contacting type head-to-disk stabilizing unit for use in disk drive apparatus that rotates a flexible storage disk, said unit comprising:
   a record and/or playback head having transducer means for coacting with a rotated disk to record or playback information on the disk; and
   a stabilizer block including (i) means defining a cavity containing said head and (ii) a flat air bearing surface which is long in proportion to width generally in a direction tangential to the direction of rotation of the disk, though is substantially smaller than the disk and disposed completely about said transducer means in substantially coplanar relation with said transducer means to permit said flat surface to penetrate with said transducer means into the nominal plane of the disk for stabilizing successive portions of the disk before each portion is located to coact with said transducer means;
   said defining means (i) forming an opening to said cavity at said air bearing surface which is long in proportion to width generally in the same direction said surface is long in proportion to width and (ii) extending completely about the sides of said head in suitably spaced relation to effect a negative pressure chamber in said cavity for inducing pull down of successive portions of the disk into contact with said transducer means as each portion is located over said opening.

2. A head-to-disk stabilizing unit as recited in claim 1, wherein said opening to said cavity has a minimum width proximate said transducer means and a maximum width remote from said transducer means to reduce pull down deformation of the flexible disk in the vicinity of said transducer means.

3. A head-to-disk stabilizing unit as recited in claim 1, wherein said opening to said cavity has a wasp waist shape with the same width dimension at longitudinally opposite ends of said opening remote from said transducer means and a reduced width dimension at an intermediate portion of said opening proximate said transducer means to reduce pull down deformation of the flexible disk in the vicinity of said transducer means.

4. A head-to-disk stabilizing unit as recited in claim 1, wherein said air bearing surface is closer to said head in the vicinity of said transducer means than at any other location on said head to provide the greatest stabilization of the flexible disk proximate said transducer means.

5. A contacting type head-to-disk stabilizing unit for use in disk drive apparatus that rotates a flexible storage disk, said unit comprising:
   a record and/or playback head having (i) an operating surface which is long in proportion to width generally in a direction tangential to the direction of rotation of the disk and (ii) transducer means at said operating surface for coacting with the disk to record or playback information on the disk; and
   a stabilizer block including (i) means defining a cavity containing said head and (ii) a flat air bearing surface disposed proximate said transducer means for stabilizing successive portions of the disk before each portion is located to coact with said transducer means;
   said defining means (i) forming a wasp waist shaped opening to said cavity at said air bearing surface which has a narrow waist proximate said transducer means and is long in proportion to width in the direction said operating surface of said head is long in proportion to width and (ii) extending completely about the sides of said head in suitably spaced relation to form a negative pressure chamber in said cavity for inducing pull down of successive portions of the disk into contact with said transducer means as each portion is located over said opening.

6. In a contacting type record and/or playback apparatus for use with a cartridge of the type (a) containing a rotatably supported flexible disk and (b) having an opening that provides limited radial access to the disk, the combination comprising:
   means for rotating the disk over the opening in the cartridge;
   a record and/or playback head having transducer means for coacting with the disk to record or playback information on the disk;
   a stabilizer block including (i) means defining a cavity containing said head and (ii) a flat air bearing surface smaller than the opening in the cartridge and disposed completely about said transducer means in substantially coplanar relation with said transducer means to permit said surface and said transducer means to enter the opening and penetrate the nominal plane of the disk for stabilizing successive radial portions of the disk before each portion is located to coact with said transducer means;
   said defining means (i) forming an opening to said cavity at said air bearing surface and (ii) extending completely about the sides of said head in suitably spaced relation to form a negative pressure chamber in said cavity for inducing pull down of successive radial portions of the disk into contact with said transducer means as each portion is located over said opening;
   means for inserting said stabilizer block through the opening in the cartridge to permit said air bearing surface and said transducer means to access the disk; and
   means for moving said stabilizer block radially along the disk.

7. The combination as recited in claim 6, wherein said opening to said cavity is long in proportion to width generally in a direction tangential to the direction of rotation of the disk for limiting pull down deformation of the disk, and said flat air bearing surface is long in proportion to width generally in the same direction as is said opening.

8. The combination as recited in claim 6, wherein said cavity is defined by a steep wall surrounding the sides of said head and disposed substantially perpendicular to said air bearing surface adjacent said opening to said cavity.

* * * * *